J. BUCKNELL.
Evaporating Pan.
No. 38,945.
Patented June 23, 1863.
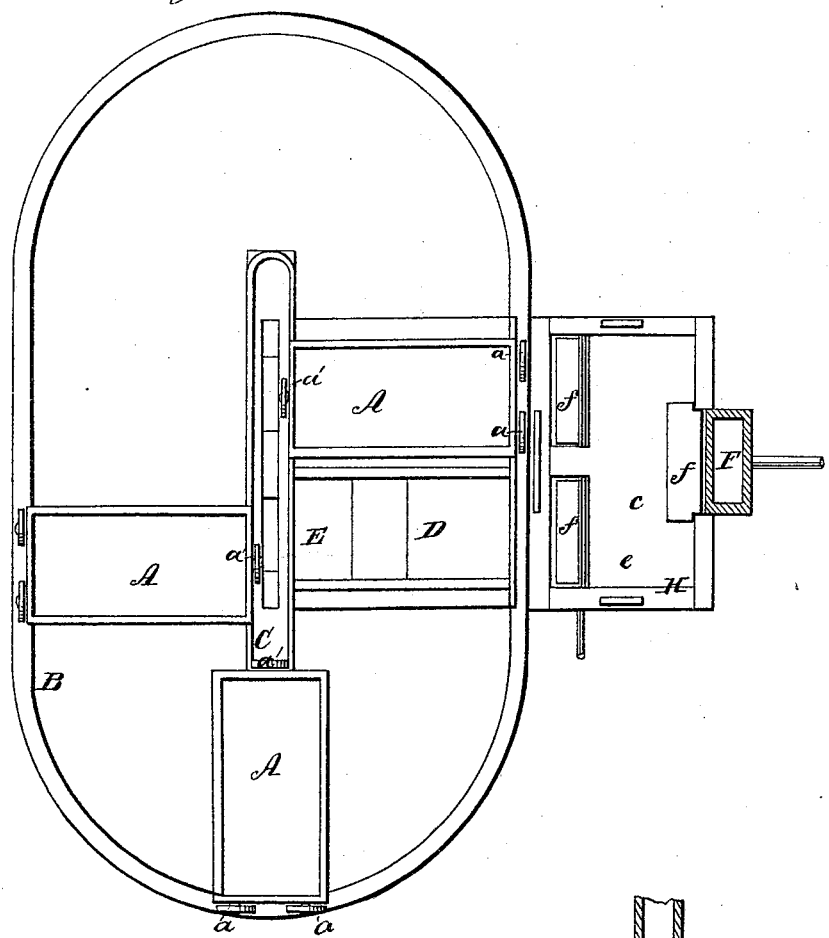
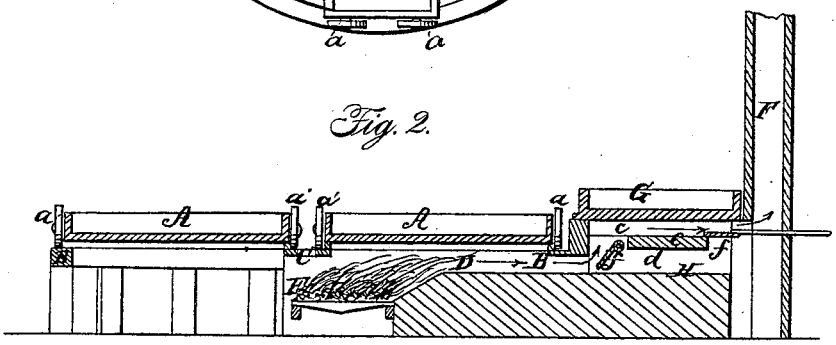
Witnesses:
J W Coombs.
G W Reed.
Inventor:
James Bucknell
per Munn & Co
Attys.

UNITED STATES PATENT OFFICE.

JAMES BUCKNELL, OF DECORAH, IOWA.

IMPROVEMENT IN APPARATUS FOR EVAPORATING SACCHARINE LIQUIDS.

Specification forming part of Letters Patent No. 38,945, dated June 23, 1863.

*To all whom it may concern:*

Be it known that I, JAMES BUCKNELL, of Decorah, in the county of Winnesheik and State of Iowa, have invented a new and Improved Evaporator for Saccharine Liquids; and I do hereby declare that the following is a full, clear, and exact description of the same, reference being had to the accompanying drawings, forming part of this specification, in which—

Figure 1 represents a plan or top view of my invention. Fig. 2 is a transverse vertical section of the same.

Similar letters of reference in both views indicate corresponding parts.

This invention consists in the arrangement of an endless oblong circular or elliptical track, in combination with wheeled pans and suitable fire-places and flues, in such a manner that when the juice or other liquid in one pan has been boiled down to the desired degree said pan can conveniently be removed to the opposite side of the track for the purpose of emptying and recharging it, and at the same time another pan can be wheeled over the arch, so that the operation of boiling is not interrupted and no heat is lost.

It consists, further, in the arrangement of a stationary pan between the fire-places under the movable pans and the chimney and over a double flue provided with dampers in such a manner that the waste heat escaping from the flues under the movable pans can be carried under the stationary pan and used to heat the contents of the same, or carried straight through to the chimney without being permitted to come in contact with said stationary pan, if it is desired to empty the contents of the same or to discharge it.

To enable others skilled in the art to make and use my invention, I will proceed to describe it.

The pans A in which the liquid is to be boiled are constructed of sheet metal or any other suitable material or materials, and they are made square or oblong or in any other desirable form. Each pan is provided with three wheels, $a\ a'$, two on one and one on the other end, and the wheels $a$ run on the outer track, B, whereas the wheel $a'$ runs on the inner track, C. These tracks may be oblong with semicircular ends, as represented in Fig. 1 of the drawings, or they may be made in any other desirable form and shape, and they are brought in such relation to each other and to the pans A that said pans can easily be wheeled over or round the tracks from one side to the other. Said tracks are elevated on posts or on a wall sufficiently high above ground to afford room for fire-places E, from which flues D extend to the chimney F. If it is desired to heat the contents of one of the pans A, said pan is wheeled over one of the flues, and when sufficiently heated it is removed to the opposite side of the track and replaced by another pan. By this arrangement the filling and emptying of the pans is considerably facilitated, and the several pans can be moved from or to the fire with ease and convenience.

The waste heat which emanates from the flues D is used to boil the contents of a stationary pan, G, which is situated over an arch, H, between the flues and the chimney. This arch is provided with two faces, $c\ d$, which are separated one from the other by a horizontal partition-wall, $e$. The upper flue, $c$, carries the heat under the pan G, and dampers $f$ serve to shut off the heat from this upper flue, and to carry it through the lower flue, $d$, directly to the chimney without allowing it to come in contact with the stationary pan. This pan can be used with advantage for the purpose of finishing the boiling of the sirup, and, if desired, several arches and fire-places can be built in the same track, so that two or more sets of pans can be kept in constant operation.

What I claim as new, and desire to secure by Letters Patent, is—

1. The arrangement of two endless tracks, B C, in combination with wheeled pans A and fire-place E, constructed and operating in the manner and for the purpose substantially as shown and described.

2. The arrangement of the double flues $c\ d$ and stationary pan G, in combination with the fire-place E, flues D, and movable pans A, constructed and operating substantially as and for the purpose specified.

JAMES BUCKNELL.

Witnesses:
   WILSON BURDICK,
   S. A. TUPPER.